United States Patent
Zahora et al.

(10) Patent No.: US 10,971,964 B2
(45) Date of Patent: Apr. 6, 2021

(54) STATOR FOR A MULTIPHASE ELECTRIC MOTOR AND METHOD OF MAKING

(71) Applicants: Joseph A. Zahora, Kettering, OH (US); William R. Compton, Fairborn, OH (US)

(72) Inventors: Joseph A. Zahora, Kettering, OH (US); William R. Compton, Fairborn, OH (US)

(73) Assignee: DAYTON-PHOENIX GROUP, INC., Dayton, OH (US)

( * ) Notice: Subject to any disclaimer, the term of this patent is extended or adjusted under 35 U.S.C. 154(b) by 0 days.

(21) Appl. No.: 16/110,522

(22) Filed: Aug. 23, 2018

(65) Prior Publication Data

US 2020/0067365 A1    Feb. 27, 2020

(51) Int. Cl.

| | |
|---|---|
| H02K 3/50 | (2006.01) |
| H02K 1/16 | (2006.01) |
| H02K 3/12 | (2006.01) |
| H02K 3/30 | (2006.01) |
| H02K 3/38 | (2006.01) |
| H02K 5/22 | (2006.01) |
| H02K 17/12 | (2006.01) |
| H02K 15/02 | (2006.01) |
| H02K 15/085 | (2006.01) |
| H02K 15/00 | (2006.01) |
| H02K 15/10 | (2006.01) |
| H02K 11/40 | (2016.01) |

(52) U.S. Cl.
CPC ............ *H02K 3/50* (2013.01); *H02K 1/16* (2013.01); *H02K 3/12* (2013.01); *H02K 3/30* (2013.01); *H02K 3/38* (2013.01); *H02K 5/225* (2013.01); *H02K 11/40* (2016.01); *H02K 15/0068* (2013.01); *H02K 15/024* (2013.01); *H02K 15/085* (2013.01); *H02K 15/105* (2013.01); *H02K 17/12* (2013.01); *H02K 2203/06* (2013.01); *H02K 2203/09* (2013.01)

(58) Field of Classification Search
CPC ......... H02K 3/12; H02K 3/28; H02K 2203/09
USPC ................................. 310/197, 198, 202, 208
See application file for complete search history.

(56) References Cited

U.S. PATENT DOCUMENTS

| | | | |
|---|---|---|---|
| 3,439,205 A | 4/1969 | Houtman | |
| 4,309,634 A | 1/1982 | Koroly et al. | |
| 4,656,378 A | 4/1987 | Atherton et al. | |
| 5,828,147 A | 10/1998 | Best et al. | |
| 7,476,995 B2 * | 1/2009 | Uchiyama | H02K 3/505 310/179 |
| 2003/0020344 A1 | 1/2003 | Futami et al. | |

(Continued)

*Primary Examiner* — Quyen P Leung
*Assistant Examiner* — Minki Chang
(74) *Attorney, Agent, or Firm* — Thompson Hine LLP

(57) ABSTRACT

A stator for a multiphase electric motor includes a plurality of laminates stacked to form a cylindrical stator core having a plurality of longitudinal slots; a plurality of electrical conductors grouped into a plurality of discrete electrical circuits, each of the plurality of the electrical conductors forming a plurality of coils in the slots spaced about the stator core, and each of the coils having a pair of leads; a plurality of bus cables, each of the plurality of bus cables having a mechanical connection to the pluralities of coils at ends of the slots; and wherein one of the leads from each of the coils is electrically connected to one of the plurality of bus cables.

20 Claims, 2 Drawing Sheets

(56) References Cited

U.S. PATENT DOCUMENTS

| | | |
|---|---|---|
| 2011/0014068 A1 | 1/2011 | Tsukamoto et al. |
| 2015/0003977 A1* | 1/2015 | Yabuuchi ............... F04D 19/002 |
| | | 415/208.1 |
| 2015/0061431 A1* | 3/2015 | Egami .................... H02K 3/522 |
| | | 310/71 |
| 2016/0044826 A1* | 2/2016 | Hartl ....................... F27D 21/00 |
| | | 361/709 |

* cited by examiner

STATOR FOR A MULTIPHASE ELECTRIC MOTOR AND METHOD OF MAKING

TECHNICAL FIELD

The present disclosure relates to multiphase electric motors, and more particularly, to stator construction for multiphase induction motors and methods of making stators for multiphase induction motors.

BACKGROUND

The essential components of an electric motor, including an alternating current (AC) induction motor, include a stator and a rotor. The rotor and stator typically are cylindrical in shape. In some designs the stator is a hollow cylinder that receives and surrounds the cylindrical rotor, which rotates relative to the stator. In other designs, the stator is sized to fit within a hollow, cylindrical rotor. In such designs the stator is mounted on a fixed platform, and the rotor may be attached to a hub or housing from which fan blades extend.

The rotor typically is comprised of disk-shaped or annular laminations, which may be made of steel, formed in a cylinder shape and having a plurality of wedge-shaped longitudinal slots spaced evenly about a periphery of the lamination stack. In embodiments the slots may be spaced about the inner periphery or outer periphery of the stator. In large, heavy-duty motors, conductors in the form of elongate wedge-shaped bars are inserted into and extend along the slots of the rotor. This arrangement of laminations and conductors are held in place by end rings on opposing ends of the lamination stack. The end rings are made of a conductive metal, such as aluminum, and electrically connect the conductor bars to each other. The end rings are welded to the end laminations of the stack and to the adjacent ends of the conductor bars.

The stator typically comprises disk-shaped laminations stacked to form a hollow cylinder. The laminations each have a series of notches that are aligned when the laminations are stacked to form a plurality of longitudinally extending slots. In some motor designs, the notches are spaced evenly about an outer periphery of the lamination stack. In other designs, the notches extend about an inner periphery of the inner cylindrical bore. In either design, insulated conductive wire is wound in the slots about the outer or inner periphery of the lamination stack to make coils. In a multiphase electric motor, the lead wires of the coils are connected to each other make two or more discrete electric circuits. Each electrical circuit is connected to a source of alternating current. Magnetic fields created by the flow of alternating current through the coils of each circuit induce magnetic fields in the adjacent rotor, causing the rotor to rotate about the center of the stator.

In one embodiment of such a heavy-duty AC induction motor, the stator is in the form of a hollow cylinder positioned within and surrounded by a rotor, also in the form of a hollow cylinder. Such a design is useful in machines such as cooling fans, in which fan blades may be attached to and driven by the rotor. AC induction motors often are utilized in harsh environments. Repeated cycles of heating and cooling, starting and stopping of rotor rotation, vibration, as well as extended periods of use, break down the motor components, including the stator. In a typical three-phase induction motor, there may be 24 or more overlapping coils of conductor wire. The lead wires of each coil in a circuit are connected, for example by a solder connection, and are insulated. These insulated lead wires are secured to the stator by tie cords that loop through the coil ends. Such structure and connections are susceptible to damage by vibration and the corrosive environment in which such motors are used.

Repair of stator coils and connections typically requires a labor-intensive and costly testing and re-wiring, often involving removal and re-winding the coils. Accordingly, there is a need for a stator design and method of manufacture that provides a robust stator, but requires minimal time and materials.

SUMMARY

The present disclosure describes a stator design for a multiphase motor, such as an AC induction motor, that is robust and resistant to degradation and damage from vibration and corrosive environment. Moreover, the disclosed stator design requires less material and less labor to manufacture.

In one embodiment, a stator for a multiphase electric motor includes a plurality of laminates stacked to form a cylindrical stator core having a plurality of longitudinal slots; a plurality of electrical conductors grouped into a plurality of discrete electrical circuits, each of the plurality of the electrical conductors forming a plurality of coils in the slots spaced about the stator core, and each of the coils having a pair of leads; a plurality of bus cables, each of the plurality of bus cables having a mechanical connection to the pluralities of coils at ends of the slots; and wherein one of the leads from each of the coils is electrically connected to one of the plurality of bus cables.

In another embodiment, a stator for a multiphase electric motor includes a cylindrical core having a plurality of longitudinal slots; a plurality of insulated electrical conductor wires positioned in the slots to form coils spaced in overlapping relation about the stator core, the coils connected to form at least three discrete electrical circuits; at least three bus cables mechanically attached to the coils, each of the at least three bus cables extending in a loop about an end of the core; and wherein each of the at least three bus cables is electrically connected to the conductor wires of the coils of a different one of the three discrete electrical circuits by electrical connectors spaced about the bus cable loops.

In yet another embodiment, a method for making a stator for a multiphase electric motor includes forming a plurality of longitudinal slots in a cylindrical stator core; placing electrical conductors in the slots to form a plurality of coils spaced in overlapping relation about the stator core, the electrical conductors grouped into a plurality of discrete circuits; mechanically attaching a plurality of bus cables to the conductor windings to form loops about an end of the stator core; and attaching the electrical conductors to the plurality of bus cables by connectors spaced about the loops, wherein each bus cable is electrically connected to electrical conductors of a different one of the plurality of discrete circuits.

Other aspects of the disclosed stator for a multiphase electric motor and method of making will be apparent from the following description, the accompanying drawings and the appended claims.

DETAILED DESCRIPTION

Figure 1:
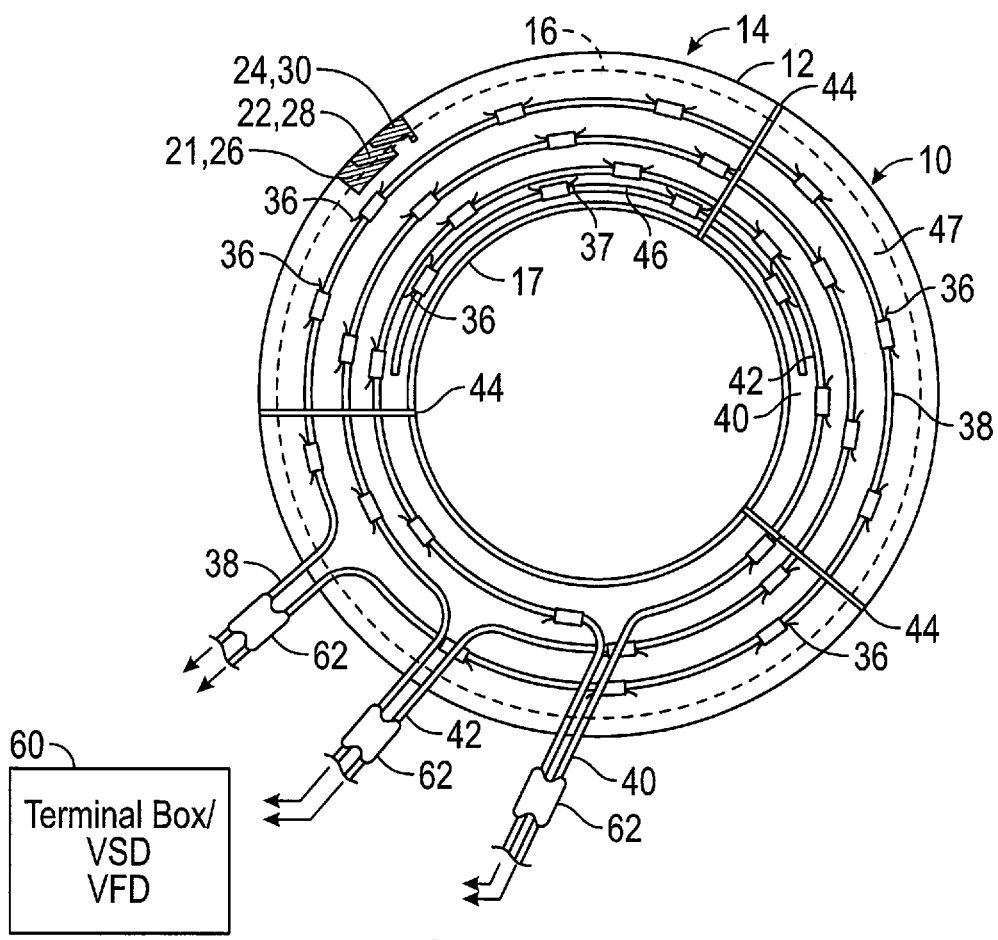
FIG. 1 is a schematic end elevation of an embodiment of the disclosed stator for a multiphase electric motor.
Figure 2:
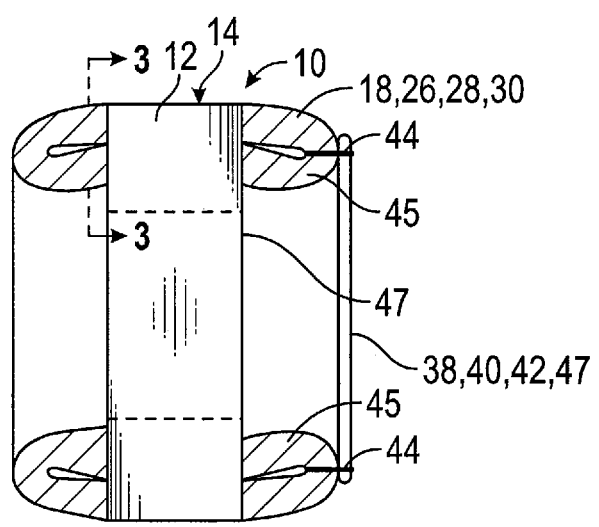
FIG. 2 is a schematic side elevation, partially in section, of the stator of FIG. 1.
Figure 3:
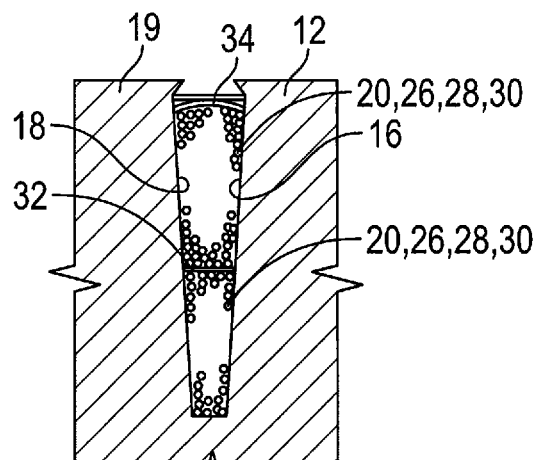
FIG. 3 is a detail showing a typical stator core slot taken at line 3-3 of FIG. 2.

As shown in FIGS. 1, 2, and 3, an exemplary embodiment of the disclosed stator for a multiphase electric motor, generally designated 10, includes a plurality of laminates 12 stacked to form a cylindrical stator core 14 having a plurality of longitudinal slots 16. In the exemplary embodiment, the laminates 12 are flat, disk-shaped plates made of steel. The laminates 12 are annular, so that the laminates of the cylindrical stator core 14 collectively form an inner wall 17 defining a cylindrical bore. In an embodiment, the slots 16 are formed by a plurality of notches 18 cut out of and spaced evenly about the peripheries of each of the laminates 12. The notches 18 of each of the laminates 12 are aligned with each other to form the longitudinal slots 16 when the laminates are stacked into the cylindrical stator core 14.

In the exemplary embodiment shown in FIGS. 1 and 3, the notches 18 are spaced evenly about the outer peripheries of the laminates 12 so that the longitudinal slots 16 are spaced evenly about the exterior surface 19 of the stator core 14. This stator 10 is used with a rotor (not shown) that extends about and receives the stator in an internal cylindrical bore. In other embodiments of the disclosed stator, the slots 16 are spaced evenly about the inner wall 17 of the cylindrical bore of the stator core 14, which would receive a correspondingly sized cylindrical rotor (not shown).

A plurality of electrical conductors 20 are grouped into a plurality of discrete electrical circuits, which in the exemplary embodiment are electrical circuits 21, 22, 24 of a three-phase AC induction motor (not shown). In the embodiment shown in the Figures, the electrical conductors 20 are insulated copper wires. In other embodiments, the conductors 20 take the form of stator bars. Each of the plurality of the electrical conductors 20 is wound to form a plurality of coils 26, 28, 30 in the slots 16 spaced about the stator core 14. In the exemplary embodiment shown, the coils 26, 28, 30 overlap each other and extend completely about the exterior surface 19 of the stator core 14. In an embodiment, the electrical conductors 20 of each of the coils 26, 28, 30 are separated from each other in the slots 16 by slot insulating paper liners 32, and the coils are retained in the slots 16 by paper sleeves 34. Each of the coils 26, 28, 30 includes a pair of leads 36, 37, which are the ends of the electrical conductors 20 that protrude from the coils and slots 16.

The stator 10 includes a plurality of bus cables, which in the exemplary embodiment shown comprise cables 38, 40, 42, of a three-phase AC induction motor. Each of the plurality of bus cables 38, 40, 42 includes a mechanical connection to the pluralities of coils 26, 28, 30 at ends of the slots. In the embodiment shown, the mechanical connection takes the form of a tie cord 44. The tie cord 44 mechanical connection in embodiments is spiral wrapped over the bus cables 38, 40, 42 and looped around and beneath the coil ends 45 protruding from the slots 16 as shown in FIG. 2.

Figure 4:
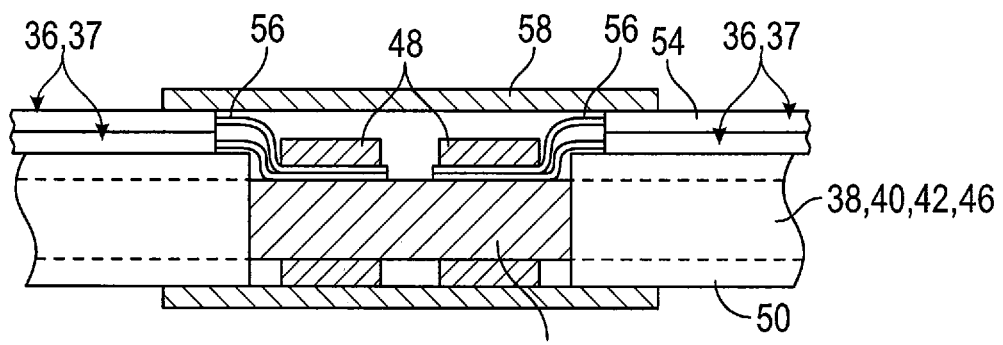
FIG. 4 is a detail showing a typical connection of coil leads to a bus cable of the stator of FIG. 1.
Figure 5:
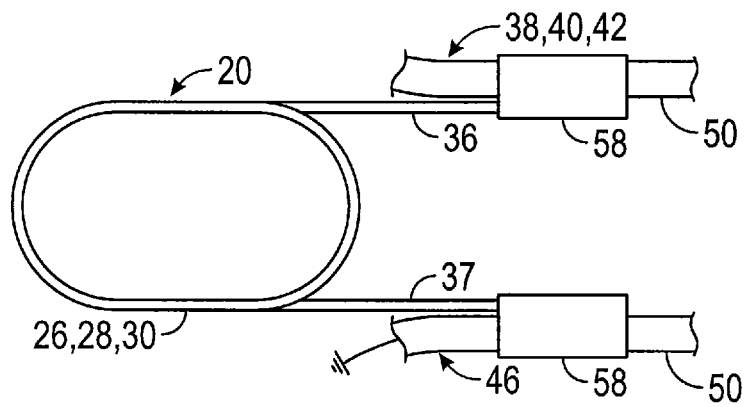
FIG. 5 is a detail showing a typical coil connected to bus cables of the stator of FIG. 1.

As shown in FIGS. 4 and 5, the leads 36 from each of the coils 26, 28, 30 are electrically connected to a different one of the plurality of bus cables 38, 40, 42. In an embodiment, one of the plurality of bus cables is a grounded bus cable 46. Grounded bus cable 46 is connected to leads 37 from each of the coils 26, 28, 30. The grounded bus cable 46 also is mechanically connected to the coil ends 45 by tie cord 44. Tie cord 44 may be made of a non-conductive material such as nylon. Thus, in an embodiment, the leads 36 of each of the individual coils 26 of circuit 21 are connected to bus cable 38, the leads of each of the individual coils 28 of circuit 22 are connected to bus cable 40, and the leads of each of the individual coils 30 of circuit 24 are connected to bus cable 42. Similarly, the leads 37 of each of the individual coils 26, 28, 30, of circuits 21, 22, 24 are connected to grounded bus cable 46.

As shown in FIG. 5, in an exemplary embodiment, each of the leads 36 of the conductors 20 of each of the coils 26, 28, 30 is attached to one of the bus cables 38, 40, 42 to form a direct electrical connection therewith. That is, the lead 36 of each of the coils 26, 28, 30 of the stator 10 is attached to the stranded conductor 52 (see FIG. 4) of one of the cables 38, 40, 42 without any intermediate component, such as another coil or coil lead. An embodiment of a direct electrical connection between the leads 36 and stranded conductor 52 is shown in FIG. 4. In other embodiments, the direct electrical connection includes a conductive paste or gel, or solder, with or without crimp connectors 48. Similarly, the lead 37, which in embodiments is a ground lead, is attached to grounded bus cable 46 by a direct electrical connection to the stranded conductor 52.

In an exemplary embodiment, the bus cables 38, 40, 42, 46 are made of stranded steel or aluminum cable 52 thicker and heavier gauge than the wire used for the coils 26, 28, 30, which is a single strand of insulated copper wire. The bus cables 38, 40, 42, 46 are each insulated with an insulation that in embodiments is selected from a silicone elastomer and polytetrafluoroethylene. As shown in FIGS. 1 and 2, each of the plurality of bus cables 38, 40, 42, 46 extends in a circular, or substantially circular, loop about an end 47 of the cylindrical stator core 14. The leads 36, 37 of each one of the plurality of coils 26, 28, 30 are electrically connected to the plurality of bus cables 38, 40, 42, 46 at points spaced along each loop.

As shown in FIG. 4, in an embodiment, all electrical connections to the plurality of bus cables 38, 40, 42, 46 from each of the coils 26, 28, 30 are made with mechanical connectors, such as crimp connectors 48, spaced along the entire length of each loop to form a direct electrical connections therebetween. For such a connection, a length of the insulation layer 50 is cut away from the bus cables 38, 40, 42, 46, exposing the stranded conductors 52. The insulation 54 is stripped from the leads 36, 37, exposing the conductor ends 56 of each. The conductor ends 56 are crimped against the stranded conductors 52 of the bus cables 38, 40, 42, 46. Also in embodiments, insulation wrapping 58 is wrapped about each of the crimp connectors. The insulation wrapping 58 also covers the stranded conductor 52 and the conductor ends 56, and overlies the insulation layer 50 of the bus cables 38, 40, 42, 46, so that electrical insulation is continuous about the lengths of the loops of bus cables. In an embodiment, the entire assembled stator 10 is dipped in epoxy resin and/or a varnish and baked, which may be in the manner disclosed in commonly owned U.S. Pat. No. 8,575,796, the entire contents of which are incorporated herein by reference.

In sum, in an exemplary embodiment, the stator 10 for a multiphase electric motor includes a cylindrical core 12 having a plurality of longitudinal slots 16; a plurality of insulated electrical conductor wires 20 positioned in the slots to form overlapping coils 26, 28, 30 spaced about the stator core and connected to form at least three discrete electrical circuits 21, 22, 24. At least three bus cables 40, 42, 44 are mechanically attached to the overlapping coils 26, 28, 30. Each of the bus cables 40, 42, 44 extends in a loop about the end 47 of the core 12 and is connected to a different one of the conductor wires 20 of the three discrete electrical circuits 21, 22, 24. The three bus cables 38, 40, 42 are electrically connected to a different one of the conductor wires 20 by connectors, such as crimp connectors 48, spaced about the bus cable loop. Insulation 58 wraps each of the crimp connectors 48.

As shown in FIG. 1, in embodiments, the ends of the bus cables 38, 40, 42, and optionally 46, extend away from the stator core 14 to a terminal box 60, which in embodiments includes a variable frequency drive, and/or a variable speed drive, also known as an adjustable speed drive. Also in embodiments, the bus cables 38, 40, 42, and optionally 46, are covered with a sheath of woven, temperature-resistant insulation 62.

In an exemplary method for making the stator 10 for a multiphase electric motor, a plurality of notched laminates 12 is stacked to form a cylindrical stator core 14 having a plurality of longitudinal slots 16. Electrical conductors 20 are placed in the slots 16 to form a plurality of conductor windings or coils 21, 22, 24 spaced about the stator core 14. The electrical conductors are connected so that they are grouped into a plurality of discrete circuits 26, 28, 30. The bus cables 38, 40, 42 are mechanically attached to the coils 26, 28, 30 to form loops about the end 47 of the stator core 14. The lead wires 36 of the electrical conductors 20 are electrically connected to the plurality of bus cables 38, 40, 42 by crimp connectors 48 spaced about the loops. Each bus cable 38, 40, 42 is connected to the electrical conductors 20 of a different one of the plurality of discrete circuits 26, 28, 30.

The exemplary method further includes connecting the bus cables 38, 40, 42, and optionally 46, to the terminal box 60, which in embodiments is a variable speed drive (VSD), a variable frequency drive (VFD), or other type of controller. In exemplary embodiments, electrically connecting the lead wires 36, 37 includes connecting the lead wires directly to the bus cables 38, 40, 42, 46 by crimp connectors 48 in a wye circuit to form direct electrical connections therewith. In embodiments, each of the plurality of bus cables is insulated with an insulation selected from a silicone elastomer and polytetrafluoroethylene. Also in embodiments, mechanically attaching the plurality of bus cables 38, 40, 42, and optionally 46, includes attaching the plurality of bus cables to the coils 21, 22, 24 by tie cords 44 spaced about the loops.

In embodiments, a lead wire 37 from each coil 26, 28, 30 of the plurality of coils is connected to a ground bus cable 46 of the plurality of bus cables to form a direct electrical connection therewith. In embodiments, each of the crimp connectors 48 is wrapped with insulating tape. Also in embodiments, placing the electrical conductors 20 in the slots 16 to form a plurality of coils 21, 22, 24 spaced about the stator core 14 includes grouping the coils into a plurality of discrete circuits 26, 28, 30 for a three-phase asynchronous electric motor.

The described design of stator 10 provides a robust and low-cost stator particularly suited to large, three-phase AC induction motors. The described method of manufacture can be effected relatively quickly and inexpensively. The resultant stator is superior to traditional stator designs. While the forms of apparatus described herein may constitute preferred embodiments of the disclosed stator for a multiphase electric motor and method of making, the invention is not limited to the aforementioned embodiments, and changes may be made therein without departing from the scope of the invention.

What is claimed is:

1. A stator for a multiphase electric motor, the stator comprising:
    a plurality of laminates stacked to form a cylindrical stator core having a plurality of longitudinal slots;
    a plurality of electrical conductors grouped into a plurality of discrete electrical circuits, each of the plurality of the electrical conductors forming a plurality of coils in the slots spaced about the stator core, and each of the coils having a pair of leads;
    a plurality of bus cables, each bus cable of the plurality of bus cables including a stranded conductor covered with insulation formed into a loop having a plurality of points spaced along the loop in which the insulation is removed exposing the stranded conductor, each of the bus cables having a mechanical connection to the pluralities of coils at ends of the slots; and
    a plurality of electrical connections between the plurality of coils and the plurality of bus cables, each of the electrical connections including the pair of leads of each of the plurality of coils having conductor ends stripped of insulation and contacting the stranded conductor at one of the points, and a plurality of crimp connectors, each of the crimp connectors holding the conductor ends of one of the pairs of leads against the stranded conductor of one of the plurality of points.

2. The stator of claim 1, wherein one bus cable of the plurality of bus cables is a ground bus cable, and the ground bus cable is connected to the plurality of coils at the end of the slots by the mechanical connection.

3. The stator of claim 1, wherein the plurality of bus cables includes at least three bus cables; and one conductor end of the conductor ends of one of the pair leads of each coil is attached to one of the at least three bus cables to form one of the electrical connections therewith.

4. The stator of claim 1, wherein each of the plurality of bus cables extends in the loop about an end of the cylindrical stator core.

5. The stator of claim 1, further comprising insulation wrapping each of the crimp connectors; and wherein the bus cables are insulated with an insulation selected from a silicone elastomer and polytetrafluoroethylene.

6. The stator of claim 1, wherein the mechanical connection includes a tie cord that extends about the plurality of bus cables and through loops of ends of the windings.

7. The stator of claim 1, wherein the plurality of electrical conductors forms the stator for a three-phase asynchronous electric motor.

8. A stator for a multiphase electric motor, the stator comprising:
    a cylindrical core having a plurality of longitudinal slots;
    a plurality of insulated electrical conductor wires positioned in the slots to form coils spaced in overlapping relation about the stator core, the coils connected to form at least three discrete electrical circuits, each of the coils having a pair of leads with conductor ends stripped of insulation;
    at least three bus cables mechanically attached to ends of the coils protruding from the slots, each of the at least three bus cables extending in a loop about an end of the core and having conductors covered by insulation and a plurality of points spaced about the loop exposing the conductors; and a plurality of electrical connections between the at least three bus cables and the coils, each of the electrical connections including a pair of the conductor ends contacting the conductor of one of the bus cables at one of the points and a crimp connector holding the conductor ends against the conductor of the bus cables.

9. The stator of claim 8, wherein one of the leads of the pair of leads of each of the coils forms one of the electrical connections to one of the at least three bus cables to form a direct electrical connection therewith.

10. The stator of claim 9, wherein the other of the leads of the pair of leads of each of the coils forms one of the electrical connections to a ground bus cable of the plurality of bus cables.

11. A method for making a stator for a multiphase electric motor, the method comprising:
forming a plurality of longitudinal slots in a cylindrical stator core;
placing electrical conductors in the slots to form a plurality of coils spaced in overlapping relation about the stator core, the electrical conductors grouped into a plurality of discrete circuits, and each conductor of the electrical conductors having a pair of leads;
forming electrical connections between a plurality of bus cables and the plurality of coils, each bus cable of the plurality of bus cables including a stranded conductor covered with insulation and formed into a loop about an end of the stator core by forming a plurality of points spaced along the loop in which the insulation is removed exposing the stranded conductor; and
completing the electrical connections by attaching conductor ends of the leads stripped of insulation to the plurality of bus cables by holding the conductor ends against the stranded conductors of the bus cables by crimp connectors at the points, wherein each bus cable is electrically connected to the electrical conductors of a different one of the plurality of discrete circuits.

12. The method of claim 11, further comprising connecting the bus cables to a terminal box.

13. The method of claim 11, wherein forming the electrical connections includes connecting one lead of the pair of leads from each coil of the plurality of coils to one of the plurality of bus cables.

14. The method of claim 11, further comprising insulating each of the plurality of bus cables with an insulation selected from a silicone elastomer and polytetrafluoroethylene.

15. The method of claim 11, wherein forming electrical connections includes covering each of the crimp connectors with insulating tape; and wherein mechanically attaching the plurality of bus cables includes attaching the plurality of bus cables to the conductor windings by tie cords spaced about the loops.

16. The method of claim 11, further comprising connecting one lead of the pair of leads from each coil of the plurality of coils to a ground bus cable of the plurality of bus cables.

17. The method of claim 11, wherein placing the electrical conductors in the slots to form a plurality of conductor windings spaced about the stator core includes grouping the electrical conductors into a plurality of discrete circuits forming the stator for a three-phase asynchronous electric motor.

18. A stator for a multiphase electric motor, the stator comprising:
a plurality of laminates stacked to form a cylindrical stator core having a plurality of longitudinal slots;
a plurality of electrical conductors grouped into a plurality of discrete electrical circuits, each of the plurality of the electrical conductors forming a plurality of coils in the slots spaced about the stator core, and each of the coils having a pair of leads;
a plurality of bus cables, each of the plurality of bus cables having a mechanical connection to the pluralities of coils at ends of the slots, wherein the mechanical connection includes a tie cord that extends about the plurality of bus cables and through loops of ends of the windings; and
wherein each of the coils includes a lead that is electrically connected to one of the plurality of bus cables.

19. A method for making a stator for a multiphase electric motor, the method comprising:
forming a plurality of longitudinal slots in a cylindrical stator core;
placing electrical conductors in the slots to form a plurality of coils spaced in overlapping relation about the stator core, the electrical conductors grouped into a plurality of discrete circuits;
mechanically attaching a plurality of bus cables to the plurality of coils to form loops about an end of the stator core, wherein mechanically attaching the plurality of bus cables includes attaching the plurality of bus cables to the conductor windings by tie cords spaced about the loops;
attaching the electrical conductors to the plurality of bus cables by connectors spaced about the loops; and
electrically connecting each bus cable to the electrical conductors of a different one of the plurality of discrete circuits, wherein electrically connecting the lead wires includes connecting the lead wires to the bus cables by crimp connectors and covering each of the connectors with insulating tape.

20. A method for making a stator for a multiphase electric motor, the method comprising:
forming a plurality of longitudinal slots in a cylindrical stator core;
placing electrical conductors in the slots to form a plurality of coils spaced in overlapping relation about the stator core, the electrical conductors grouped into a plurality of discrete circuits, and each conductor of the electrical conductors having a pair of conductor leads;
forming electrical connections between a plurality of bus cables and the plurality of coils, each bus cable of the plurality of bus cables including a bus cable conductor covered with insulation and formed into a loop about an end of the stator core by forming a plurality of points spaced along the loop in which the insulation is removed exposing the bus cable conductor; and
completing the electrical connections by attaching conductor leads to the plurality of bus cables by holding the conductor leads against the bus cable conductors by crimp connectors at the points, wherein each bus cable is electrically connected to the electrical conductors of a different one of the plurality of discrete circuits.

* * * * *